This invention relates to a process of regenerating aqueous alkaline caustic materials which have been used in petroleum refining. More particularly, this invention relates to a method of regenerating a spent caustic solution, which caustic solution was obtained by the treatment of hydrocarbon streams to remove sulfur and oxygen contaminants. Specifically, this invention relates to a method of treating spent caustic streams obtained from the treatment of hydrocarbon fractions whereby the spent caustic streams are regenerated by the addition of small amounts of cyclic sulfide or imine reagents which react with the caustic-soluble organic contaminants to form caustic insoluble materials which separate in an oily layer containing the contaminants leaving a separated aqueous caustic layer free of contaminants. The invention also relates to a process of regenerating spent caustic by selective solvent extraction of contaminants from the spent caustic using the separated cyclic sulfide or imine-reagent conversion compounds as the extraction solvent.

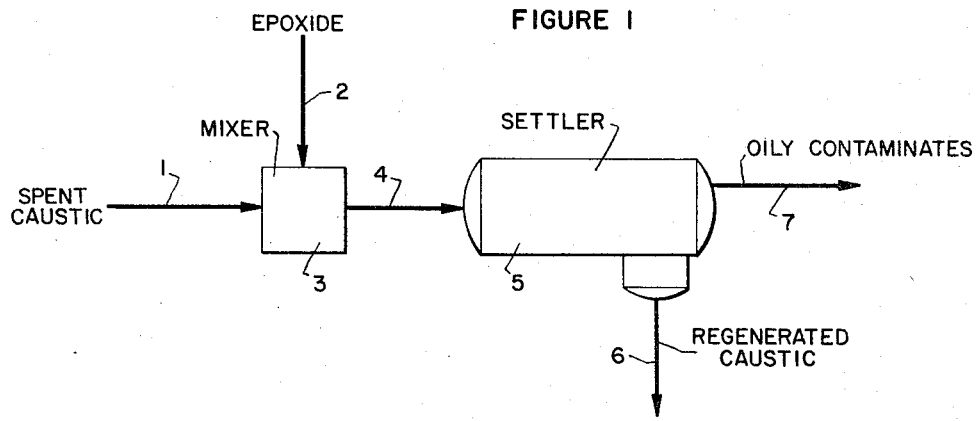
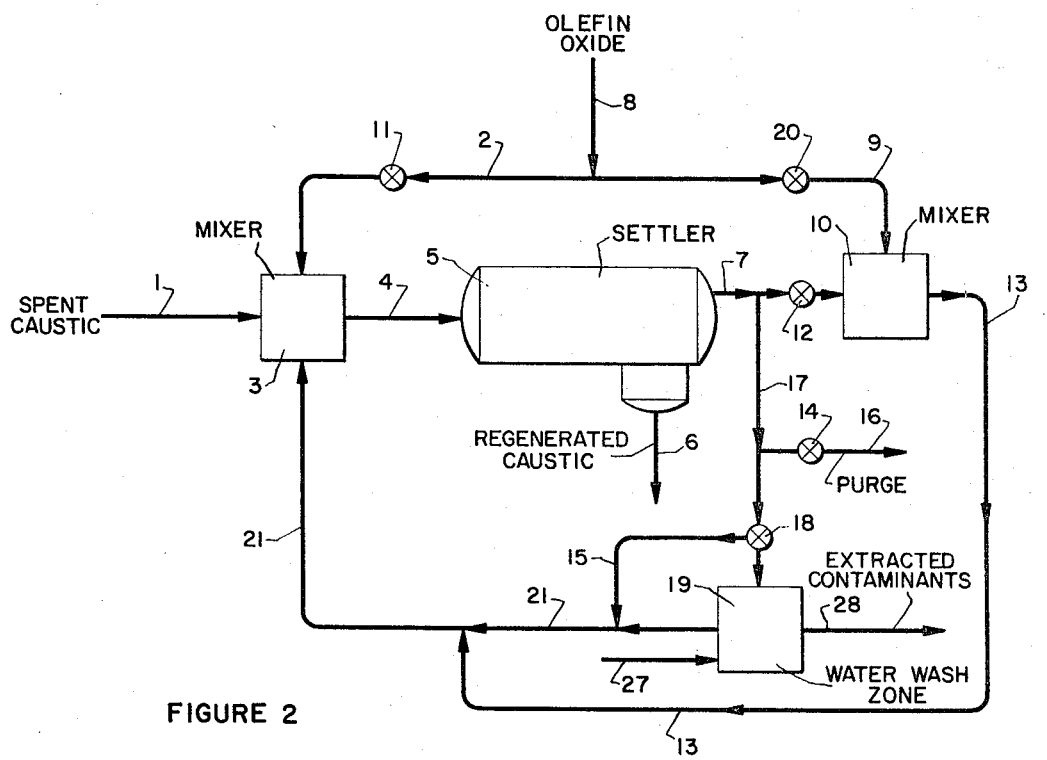
William Judson Mattox INVENTOR
BY Perry Carvellas
PATENT ATTORNEY 3,291,566
SPENT CAUSTIC RECOVERY
William Judson Mattox, Baton Rouge, La., assignor to Esso Research and Engineering Company, a corporation of Delaware
Filed Dec. 31, 1962, Ser. No. 248,417
3 Claims. (Cl. 23—184)

The agent used in regenerating the spent caustic in accordance with the present invention is a cyclic sulfide or imine reagent. Generally, caustic solutions are contacted with petroleum streams to remove certain contaminants from the petroleum streams, for example, mercaptans, hydrogen sulfide, phenols, thiophenols, naphthenic acids, etc. The reactions which may occur when contacting a hydrocarbon stream with caustic are given below:

STEP 1

$$H_2S + 2NaOH \rightarrow Na_2S + 2H_2O$$
$$RSH + NaOH \rightarrow RSNa + H_2O$$
$$R'OH + NaOH \rightarrow R'ONa + H_2O$$
$$R''COOH + NaOH \rightarrow R''COONa + H_2O$$
$$R'SH + NaOH \rightarrow R'SNa + H_2O$$

On contact with the caustic, contaminants such as mercaptans, phenols, thiophenols, naphthenic acids, etc., are converted to the sodium salts which are caustic-soluble and are extracted into the caustic leaving the petroleum fraction being treated free of these contaminants. After a certain number of treatments, the caustic materials become saturated or spent in that they have absorbed so much of these contaminants from the petroleum stream that they can no longer absorb additional quantities of contaminants. At this point the caustic must be either disposed of or regenerated. To regeneate the spent caustic is it necessary to remove these caustic-soluble salts of the contaminants absorbed from the petroleum stream.

In accordance with the present invention this is carried out by contacting the spent caustic stream with a cyclic sulfide or imine reagent. The principal reactions involved are not yet definitely established, but appear to comprise the following types of condensation or related conversion reactions. These are shown below in Step 2.

STEP 2

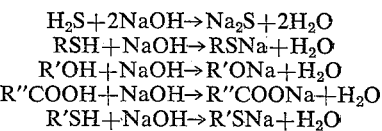

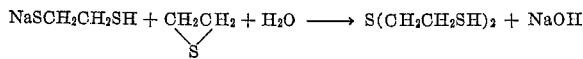

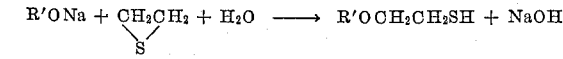

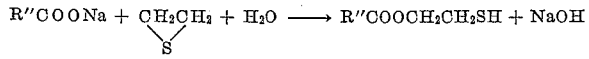

Reaction of the mercaptides alkali metal sulfides, alkali metal phenolates, thiophenolates, and naphthenates with cyclic sufide or imine reagent produces addition products or adducts which are caustic-insoluble and which separate and form an oily layer. It is necessary to add sufficient cyclic sulfide or imine reagent to convert mercaptide and sulfide compounds to their respective addition products and a sufficient amount to convert at least a portion of the naphthenates, phenolates, and thiophenolates to their addition products.

The higher molecular weight aromatic addition or convention products are insoluble in the caustic and precipitate out of the caustic, separating as an oily phase.

The separated oily phase, however, has a high degree of solubility for the mercaptides and for the mercaptide and sulfide conversion products, as well as for unreacted phenolates, naphthenates, and thiophenolates. These compounds are selectively extracted from the aqueous caustic solution into the oily phase. Therefore, it is not necessary to completely react all the contaminants present in order to obtain good regeneration of a spent caustic stream. Due to the higher solubility of the mercaptides and sulfide conversion products in the separated oil layer than in the caustic phase, these materials pass into the oil layer and leave the caustic layer substantially free of dissolved mercaptides and mercaptide conversion products. Thereby, a substantially purified caustic material, or a regenerated caustic material, can be obtained with less than stoichiometric amounts of cyclic sulfide or imine reagent.

After addition of the reagent, the mixture is allowed to separate into an oily phase and an aqueous caustic phase free of the organic contaminants, and these two phases are separated by conventional means after a suitable settling time. The separated oil phase contains cyclic sulfide or imine reaction products of mercaptides, sulfides, aromatic compounds such as phenols, thiophenols, and naphthenic acids as their conversion products. The separated oil phase can be washed with water to remove some dissolved caustic, which diluted caustic can be returned to the concentrated aqueous phase. After separation, the aqueous caustic phase, now free of dissolved caustic-soluble organic compounds, may be reused without further treatment.

As seen from the above reactions, in treating the alkali metal salts of the mercaptans, phenolates, thiophenolates, and naphthenates with cyclic sulfide or imine reagents aliphatic and aromatic ether thiols and amines and esters are obtained. The inventive feature involved in this invention is in efficiently and conveniently removing substantially all of the caustic-soluble contaminants from the spent reagent using relatively little cyclic sulfide or imine reagent, rather than in recovering all of the combined sodium. This can be done without reacting all of the compounds containing combined sodium. For example, a spent caustic solution may contain about 5 wt. percent of contaminants. On removal of this 5 wt. percent of contaminants, a substantially pure concentrated aqueous caustic solution of 95% by wt. of the spent caustic is obtained. However, it is found that a substantial amount of combined sodium is recovered. The amount of cyclic sulfide or imine reagent it is necessary to use to carry out the regeneration is an important consideration in the economies of the process.

In another embodiment of this invention it is found that the cyclic sulfide or imine conversion products obtained and separated after treating a spent caustic stream with the sulfide or imine reagent is in itself an excellent solvent for extracting from other spent caustic streams the caustic-soluble contaminants. Efficient use of the sulfide or imine reagent is made by collecting the separated etherized conversion products from the cyclic sulfide or imine treatment of the spent caustic, washing this material to remove dissolved caustic and soluble conversion products, and subsequently contacting untreated spent caustic with this conversion product, and selectively extracting from the untreated spent caustic the mercaptans, naphthenates, thiophenols, and phenolates into the oil phase containing etherized conversion products.

The mercaptans and sulfides in the spent caustic tend to preferentially react with the cyclic sulfide or imine reagent. It is therefore desirable to add a sufficient amount of cyclic sulfide or imine reagent to react with these materials and convert them to their conversion products and add sufficient excess of cyclic sulfide or imine reagent to react with at least a substantial portion of the phenolates, thiophenolates, and naphthenates, which materials on reacting with the reagent become caustic-insoluble and precipitate from the aqueous caustic solution. The amount of reagent added to the spent caustic is about mol/mol or less of the cyclic sulfide or imine to oil contaminant material present.

The regeneration of caustic treating agents has previously been performed by methods which are disadvantageous for various reasons. Thus, electrolytic regeneration has the disadvantage of expensive equipment and the necessity of using large amounts of high cost electrical power. Regeneration by steam distillation has the disadvantage of requiring large amounts of steam and high temperature equipment. It is also known in the art to treat spent caustic containing mercaptides, phenolates and naphthenates with an epoxide to convert the sodium mercaptides to sodium hydroxide and thioethers, and to leave the phenolates and naphthenates substantially unconverted and in solution. This stream containing aqueous caustic and caustic-soluble thioethers and aromatic salts is then contacted with another hydrocarbon stream wherein the thus treated caustic stream reacts with additional mercaptans to form sodium mercaptides while the thioethers in the caustic are partially extracted from the caustic by the oil being treated. This process relies upon the subsequent contact of the partially regenerated caustic stream with additional oil streams to remove from the caustic the soluble thioethers, thus preventing a build-up in the caustic stream of the thioethers. Absorption of the thioethers into a subsequently treated hydrocarbon stream, however, is highly undesirable if such a stream is to be used, for example, for gasoline blending. The presence of the thioethers reduces the susceptibility of the thus treated streams to tetraethyl lead octane improvement.

The problems to be overcome in the prior art methods of regenerating spent caustic are to use simple, less complex equipment than electrolytic methods of regenerating spent caustic, to use less heat than the previously used steam regeneration method, and to use a method whereby the regenerated caustic does not contain caustic-soluble sulfur compounds which on treating additional hydrocarbons allows the absorption back into the hydrocarbon of the caustic-soluble, oil soluble, sulfur compounds, thus putting back sulfur compounds, though in a different form, into the hydrocarbon streams being treated by the caustic solution. Further, the prior art methods provided a regenerated caustic which had present in it, and which allowed a buildup of phenolates, naphthenates, and thiophenolates, since these materials were not selectively removed from the caustic prior to its reuse. After a sufficient time, the caustic stream would become so contaminated with these products that it would not be useful for treating hydrocarbon streams as, even if mercaptans were not present in the caustic stream, the high concentration of phenolates, naphthenates, and thiophenolates would prevent additional absorption of mercaptans from the treated hydrocarbon streams.

It is, therefore, an object of the present invention to provide a simple, economic method of regenerating spent caustic streams where the regenerated caustic streams obtained are substantially free of dissolved sulfur and oxygen-containing contaminants and where the caustic stream may be used subsequently to treat hydrocarbon streams without absorption in the subsequently treated hydrocarbon streams of caustic-soluble sulfur or oxygen compounds.

In accordance with the present invention a substantially pure regenerated caustic material is recovered. The process of this invention may be applied to alkaline materials which have been used to refine various petroleum materials. The caustic solution or spent caustic solution which may be treated in accordance with this invention may be obtained from various petroleum refining processes in which an aqueous caustic reagent had been used to treat crude oil, reduced crude, kerosene, spirits, gasoline, gas, oil, furnace oil, diesel fuel, jet fuel, lubricating oil, etc., to remove various undesirable contaminants which are selectively extracted by the caustic reagent. Particularly, straight run and cracked middle distillates are treated to remove undesirable constituents by washing with a caustic reagent. Various hydrocarbon feed streams contain various compounds which it is desirable to remove, such as mercaptans, phenols, thiophenols, and naphthenic acid compounds. These compounds, on being treated with a caustic solution, are converted to their alkali metal salts, which compounds are soluble in aqueous caustic solution and are selectively extracted from the hydrocarbon stream being treated. After successive treatments of a particular hydrocarbon stream with an aqueous caustic reagent, the concentration of the alkali metal salts of mercaptans, phenols, thiophenols, and naphthenic acids, become such that additional materials can not be selectively extracted from the hydrocarbon streams being treated. The caustic soluble alkali metal salts are usually alkali metal mercaptides, alkali metal phenolates, alkali metal thiophenolates, and alkali metal naphthenates. Depending on the concentration of the alkali metal hydroxide in the aqueous caustic reagent the amount of these materials that can be selectively extracted will vary.

In accordance with the present invention, the concentration of alkali metal reagent may be about 10 to 60 wt. percent, a reagent of more than 25 to about 50 wt. percent can be used and it is preferred to use a concentrated reagent of 30 to 45 wt. percent of alkali metal hydroxide in the aqueous reagent. Heretofore, it has been undesirable to use concentrated reagents because of the difficulty of regenerating the concentrated caustic solution. It has been necessary to use dilute aqueous caustic solutions which are not as efficient in extracting the contaminants from the hydrocarbon streams being treated.

In accordance with the present invention, concentrated caustic solutions of 10–60 wt. percent alkali metal hydroxide can be used to selectively extract contaminants from the hydrocarbon streams being treated and may, with ease and efficiency, be regenerated to recover up to 98% or more of the uncombined alkali metal hydroxide originally present which can be recovered in an undiluted form which can be used without further treatment to contact additional hydrocarbon material.

When the aqueous caustic reagent is used to treat a hydrocarbon stream as mentioned above, the amount of organic contaminants that can be absorbed in the aqueous caustic stream will vary with the concentration of the aqueous caustic reagent as well as with the particular contaminants absorbed. Generally, the aqueous caustic reagent will absorb 2 to 25 wt. percent of caustic-soluble oil contaminants, and preferably, depending on the means of regeneration used and the conditions for regeneration, 5 to 15 wt. percent of caustic-soluble oil contaminants can be absorbed. Specifically, for most practical purposes, the aqueous caustic reagent will be regenerated when less than about 8 to 10 wt. percent of caustic-soluble oil contaminants have been absorbed in the caustic reagent. Depending on the particular hydrocarbon stream being treated by the caustic reagent, the compositions of the caustic-soluble contaminants will vary. For a high sulfur, straight run fraction, the contaminants will be primarily mercaptans and sulfides, some phenol compounds, and some thiophenols. With cracked hydrocarbon streams there will be alcohols, acids, and more phenol and thiophenol compounds. Generally, the spent caustic streams being treated in accordance with the present invention will contain 5 to 100% by wt. of aromatic compound contaminants, based on total amount of contaminants, usually from 10 to 50 wt. percent of aromatic compounds, and with most streams being treated the aqueous caustic-soluble contaminants dissolved in the caustic reagent will comprise about 15 to 25% by wt. of aromatic contaminants. Primarily, the constituents of the aqueous caustic oil contaminants dissolved in the spent aqueous caustic reagent will be alkali metal mercaptides, alkali metal thiophenols, alkali metal phenolates, alkyl substituted phenolates, and alkali metal naphthenates.

In accordance with the present invention, spent caustic from the treatment of hydrocarbon fractions is regenerated by the addition of small amounts of a cyclic sulfur or imine reagent, which reagent reacts with the caustic-soluble organic compounds to form caustic-insoluble materials from which the aqueous caustic is separated in purified form. The reactions which may take place in the caustic-soluble oil contaminants with the cyclic sulfide or imine reagent are shown in Step 2 above.

Suitable cyclic sulfide or imine reagents are those compounds having a 3- or 4-member heterocyclic ring containing one sulfur or nitrogen atom and two or three carbon atoms. Preferred epoxide reagents for use according to the invention are those having the formula

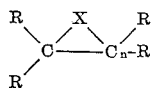

where R is selected from a group consisting of hydrogen and hydrocarbon radicals having one to six carbon atoms, which radicals may be alkyl, cycloalkyl or aromatic. In the formula, $n$ equals one or two, and X is either S or N. Preferably, most of the R's are hydrogen and the other R's which are hydrocarbon radicals contained 1 to 3 carbon atoms. Examples of compounds which can be used in accordance with the present invention are ethylene imine, ethylene sulfide, propylene sulfide, propylene imine, azacyclobutadiene, butylene sulfide, phenyl ethylene imine, cyclohexylethylene sulfide, propyl ethylene sulfide and the like. Seven member heterocyclic compounds which have been found to be very good reagents are hexamethylene sulfide and hexamethylene imine and may be used in accordance with this invention.

Sufficient cyclic sulfur or imine reagent is added to the spent aqueous caustic solution to convert the mercaptides and any sulfide, if present, to corresponding sulfur or imine conversion products. Also, sufficient reagent is added to convert a substantial portion of the caustic-soluble alkali metal aromatic contaminants present to their respective caustic-insoluble conversion products. Generally, it can be considered sufficient if stoichiometric amounts of a cyclic sulfide or imine reagent are added to provide a mol/mol reaction with the aqueous caustic organic contaminants present. However, satisfactory conversions and separations can be obtained where just a substantial portion of the aromatic alkali metal contaminants are converted to the etherized products, since if these products are obtained from solution they precipitate from solution and form a separate oily phase and, due to their high solubility for the caustic-soluble conversion products of the mercaptides and sulfides and to the high solubility for unconverted or unreacted phenolates, thiophenolates, and naphthenates, these materials are selectively absorbed into the separated oily phase and do not have to be reacted with additional cyclic sulfide or imine reagent to obtain a satisfactory separation. This results in a substantial savings or reagent over that required for stoichiometric or mol/mol reaction of all the contaminants present. However, sufficient excess of reagent is added to react at least a substantial portion of the aromatic substituents. It is necessary that sufficient cyclic sulfide or imine reagent be added to react with at least a substantial portion of the higher molecular weight aromatic compounds, which etherized products are caustic-insoluble and which precipitate from solution to form two separate phases.

Generally, in accordance with the present invention, 0.1 to 2.0 mols of cyclic sulfide or imine reagent per mol of caustic-soluble oils can be used. Preferably 0.25 to 1.5 mols of reagent to caustic-soluble oils is sufficient. Specifically, in accordance with the preferred embodiment of the invention, 0.5 to 1.0 mol of cyclic reagent to caustic-soluble oil contaminants is used.

It is unexpectedly found in carrying out the process of this invention that as the molecular weight of the cyclic sulfur or imine reagent increased, e.g., from ethylene to butylene, the solubility of the aqueous caustic in the etherized oil separated phase decreases so that a higher percentage of free caustic is recovered in the regenerated aqueous phase. It was also found that the residual oil in the regenerated caustic decreases at a given cyclic sulfide or imine to oil ratio as the concentration of the spent caustic increases. The criticality of the caustic concentration of the spent caustic is completely unexpected and in some instances determines to a large extent the amount of etherized oil contaminant that is precipitated from the aqueous caustic phase. It was also found that for a given caustic concentration in the spent caustic reagent the residual oil content of the regenerated caustic decreases as the cyclic sulfide or imine to oil ratio increases, until solubility of the etherized oil in the caustic becomes limiting. Therefore, in accordance with the present invention, efficient separations of cyclic conversion products of oil contaminant can be obtained by operating at high concentrations of caustic and adequate ratios of cyclic sulfide or imine reagent to caustic-soluble contaminants and by using the higher molecular weight cyclic sulfides and imines as reagent compounds.

The temperature at which the cyclic reagent is reacted with the spent aqueous caustic solution is not critical and may be within the range of 25 to 300° F. The temperature does have, to a certain degree, a relationship to the amount of caustic which is dissolved in the separated etherized oil phase. So to this extent it is significant. The pressure at which the cyclic reagent-caustic soluble oil reaction is carried out is not critical and may be within the range of 5 to 30 p.s.i.g. It is desirable, however, that the pressures are such that the reaction is carried out in the liquid phase.

In accordance with the present invention, a caustic solution which has been used to treat a hydrocarbon stream to remove materials such as H₂S, mercaptans, phenols, and naphthenic acids is regenerated by intimately mixing the spent caustic with a cyclic sulfide or imine reagent. The spent caustic is contacted with 0.1 to 2.0 gms. of cyclic reagent per gm. of caustic-soluble contaminant, preferably 0.20 to 1.5 gms. of cyclic reagent per gm. of caustic-soluble contaminant and specifically 0.25 to 1.0 gm. of cyclic reagent per gm. of contaminant. This ratio referred to is gram of cyclic reagent per gram of caustic-soluble contaminant in the spent caustic reagent. After treatment, sufficient time is allowed to have the cyclic reagent react with the caustic-soluble organic components dissolved in the spent caustic. The reaction time will vary somewhat with the particular reagent used. The mercaptides in the spent caustic reagent tend to react preferentially with the cyclic sulfide or imine reagent to form etherized mercaptans, for example, thioethers. The aromatic compounds present in the caustic reagent react with the cyclic sulfide or imine to produce high molecular weight etherized products which are insoluble in the aqueous caustic reagent and precipitate our forming a separate oily phase. The separated oily phase has a high degree of solubility for the caustic-soluble etherized mercaptans as well as sulfides and draws these materials selectively into the oily phase. This oily phase also has a high degree of solubility for unreacted aromatic contaminants which are also selectively extracted from the spent caustic stream and are drawn into the separated oily phase. The separated oily phase may be washed with water to remove small amounts of dissolved caustic, which dilute material may be added to the separated, concentrated caustic. The organic contaminants of spent caustic streams, containing mercaptides, phenolates, thiophenolates, and naphthenates, on contact with the cyclic sulfide or imine reagent are converted, for example, to alkyl thioethers, and amines and aromatic alkyl esters and aromatic ethers, thioethers, and amines. The separated oily phase contains what will be and has been described as etherized conversion products. The separated aqueous caustic phase is substantially free of caustic-soluble organic contaminants as well as from caustic-soluble etherized conversion products and is in undiluted form and may be used substantially as it is for caustic treating hydrocarbon feed streams to remove sulfur and oxygen-containing contaminants from the said streams.

In another embodiment of the present invention, in order to conserve cyclic sulfide or imine reagent the separated etherized conversion products removed after the conversion reaction may themselves be used as a solvent, which solvent has a high degree of solubility for the contaminants normally present in a spent aqueous caustic stream. The etherized oil can be used as a selective solvent to selectively extract from spent caustic streams the alkali metal mercaptides, phenolates, alkyl phenolates, thiophenolates, and naphthenates, from these streams. This separated etherized oil is found to be an excellent solvent for this purpose, thus saving on cyclic reagent.

In contacting spent caustic streams with etherized oil to selectively extract the contaminants from the caustic stream, the volume ratio of etherized oil to caustic-soluble hydrocarbon contaminant in the spent caustic may be from 0.25 to 4 of etherized oil to caustic-soluble contaminants. Preferably, however, a ratio of 0.5 to 2 is used, and specifically a ratio of etherized oil conversion products as the selective solvent to caustic-soluble contaminants of about 1:1 is preferred and has been found to be completely satisfactory to selectively extract substantially all of the contaminants from the spent caustic.

Several variations are possible within the breadth and scope of the present invention. For example, all of the contaminants can be removed from the aqueous caustic stream by selective extraction with the etherized oil and then the extract phase can be subsequently treated with small amounts of cyclic sulfide or imine reagent to convert the selectively extracted contaminants from the aqueous caustic stream to their corresponding etherized products.

Also, a spent caustic stream can be only partially extracted with the etherized oil solvent and then the aqueous phase containing lesser amounts of caustic-soluble contaminants can be subsequently treated with cyclic reagent to convert the remaining contaminants to their caustic-insoluble etherized conversion products which are subsequently removed from the caustic phase as previously described. The sequence in which the steps are carried out will largely be determined by the amount of reagent available and the number of process steps which can be efficiently carried out. By utilizing the caustic-insoluble etherized material as a selective extraction solvent, substantial savings in cyclic reagent can be accomplished. However, the use of this material as a selective extracting solvent to treat subsequent spent caustic materials will be determined to a large extent by the cost of the cyclic reagent and the expense involved in the additional process steps.

Many advantages accrue from the process of the present invention. The invention avoids the necessity of supplying large amounts of heat to provide the steam for the steam regeneration. This process avoids the expense and the equipment requirements used in electrolytic regeneration. It also avoids having a regenerated caustic stream, which on subsequent contact with hydrocarbon feed streams, to remove contaminants, allows the passage of thioethers (i.e., mercaptan conversion products) back into the treated hydrocarbon streams. The present method of regeneration of the caustic stream provides a regenerated caustic which is substantially free of contaminants and does not allow the passage of a caustic-soluble reaction product to pass back into the hydrocarbon streams being treated. Therefore, subsequent hydrocarbon streams treated with the spent caustic regenerated in accordance with present invention will have higher susceptibilities to tetraethyl lead than those treated with caustic regenerated in accordance with prior known processes.

The invention will be further described with reference to the attached drawings, wherein FIGURE 1 illustrates regeneration of used caustic by treatment with a cyclic sulfide or imine.

FIGURE 2 illustrates an embodiment where etherized oily contaminants are used as a selective solvent to extract caustic-soluble organic contaminants from the caustic.

The spent caustic solutions, which are regenerated in accordance with this invention, have little or substantially no alkali metal sulfides present. The low sulfide concentration is usually realized by first separately stripping $H_2S$ from the hydrocarbons which are to be caustic treated prior to the caustic treatment so that very little alkali metal sulfide is formed during the caustic treatment. This is desirable because the alkali metal sulfide reacts with the cyclic sulfide or imine reagent and consumes large amounts of the reagent. The alkali metal sulfide concentration in spent caustic is generally less than about 0.1% of the caustic content and usually is essentially zero. Large amounts of alkali metal sulfide can be tolerated, but at the expense of a large cyclic reagent consumption, which consumption is preferably avoided. In the embodiment employing the conversion products as selective solvents for treating spent caustic, the alkali metal sulfides can be removed without consumption of cyclic reagent and may be removed from the solvent by water washing.

Now, referring to FIGURE 1 of the drawings, a spent aqueous caustic solution obtained from caustic treatment of a catalytically cracked gasoline stock, containing about 30 to 40 wt. percent of an alkali metal hydroxide, and containing about 3 to 10 wt. percent of caustic soluble organic contaminants and containing little or no alkali metal sulfide, with a concentration of aromatic compounds in the caustic-soluble oil contaminants of 10 to 25% by weight based on contaminants is regenerated. The spent caustic is fed through line 1 into mixer 3 wherein it is intimately mixed with ethylene sulfide introduced through line 2 at a molar ratio of ethylene sulfide of 0.5 to 1.0 per mole of organic contaminant. This is equivalent to about 0.25 to 0.50 gram of ethylene sulfide per gram of organic contaminant in the caustic. Spent caustic and the ethylene sulfide are mixed for a sufficient period of time to allow reaction of the ethylene sulfide with the contaminants present in the spent caustic. The mixture is removed through line 4 and introduced to settler 5. The primary contaminants in the spent caustic stream introduced through line 1 are alkali metal mercaptides, phenolates, thiophenolates, and naphthenates. Mercaptide compounds on reaction with the sulfide reagent form an etherized mercaptide product. The cyclic sulfide reagent on reacting with the aromatic contaminants form etherized and esterified aromatic products. The etherized and esterified reaction products are insoluble in the concentrated caustic and separate out of the caustic solution as an oily layer. On separation of the aromatic constituent reaction products, any unreacted aromatic contaminants as well as conversion products of the mercaptan compounds are drawn selectively into the separated oily phase and removed from the aqueous phase. After a short period of time the precipitated oil contaminants separate by gravity settling from the aqueous caustic phase and the oily contaminants are withdrawn through line 7 and a substantially contaminant-free aqueous caustic phase is withdrawn through line 6. The regenerated caustic in line 6 contains undiluted alkali metal hydroxide of about 30 to 40 wt. percent concentration and 85 to 100% or more of the alkali metal hydroxide originally present in the caustic is recovered. The oily contaminants in line 7 contain etherized phenols, etherized thiophenols, and esterified naphthenates as well as etherized mercaptides.

This material may be disposed of or used in accordance with the process described in FIGURE 2 as a selective solvent for extracting contaminants from spent caustic streams. The regenerated caustic may be stored, concentrated and sold, or recirculated and used again to contact hydrocarbon streams to selectively extract contaminants from the streams.

Now, referring to FIGURE 2 of the drawings, spent aqueous caustic is introduced through line 1 into mixer 3 wherein it is mixed with ethylene sulfide reagent to precipitate from the spent stream caustic-insoluble, high molecular weight etherized aromatic conversion products. The mixture is drawn through line 4 and allowed to settle in settler 5. During this operation, valve 11 is open allowing introduction of ethylene sulfide through line 8, line 2, and via valve 11. Valve 20 is closed. The mixture is introduced into settler 5 and the etherized caustic-insoluble contaminants are allowed to settle out and are withdrawn through line 7. The contaminant-free aqueous caustic is removed through line 6. At this point, two different sequences of steps may be followed. The extract can be fed through valve 12 into mixer 10 and valve 20 may be opened and ethylene sulfide introduced through line 9 into mixer 10. Where ethylene sulfide is allowed to react with any absorbed unreacted caustic-soluble contaminants which are absorbed in the etherized aromatic contaminants removed from the caustic treating step, these contaminants, after reaction with ethylene sulfide, are removed through line 13 and recycled and introduced into line 21 for the purpose to be described below.

Alternately, the etherized aromatic solvent may be taken through line 17 and withdrawn through valve 14 and disposed of. The cost of the cyclic sulfide reagent is a major factor in the economics of the regeneration. It may be desirable to conserve the etherized oil contaminants and use them as a selective extraction solvent for selectively extracting contaminants from spent aqueous caustic streams, in which case the etherized oil contaminants are taken through line 17, valve 18, line 15 and line 21, and recycled to mixer 3, where valve 11 is closed and the etherized oil contaminants are intimately mixed with newly introduced spent caustic solution from line 1 whereby the etherized oil contaminants selectively extract from the spent caustic solution caustic-soluble sodium mercaptides, sodium phenolates, sodium thiophenolates and naphthenates. This extraction may be carried out in a batch method or in a continuous method by suitable arrangements known in the art. One or more extracts may be carried out. The selectively extracted contaminants from the spent caustic are withdrawn through line 4 together with the spent caustic and introduced to settler 5, where the etherized oil contaminants, together with the newly selectively extracted contaminants, separate out and are withdrawn through line 7. The caustic substantially free of oily contaminants is again withdrawn through line 6. The extract phase can be fed through line 17 and recycled until there is a substantial buildup of selectively extracted unetherized contaminants from spent caustic, in which case it can be alternately fed through valve 12 into mixer 10 where these extracted contaminants are reacted with ethylene sulfide reagent introduced through line 9 to provide more etherized oil selective solvent which is then withdrawn through line 13 and recycled. Alternately it can be fed through line 17, valve 18, into zone 19 whereby the selectively extracted contaminants which have built up and which have not been etherized with the ethylene sulfide reagent can be removed by water washing with water introduced through line 27 to separate out the unreacted materials and the more soluble components of the etherized adducts. The thus treated etherized oil solvent is separated from the water wash and fed through line 21 and recycled. The separated contaminants are removed by line 28.

In another embodiment of the invention the spent caustic may be treated in mixer 3 with etherized oil to selectively extract a portion of the contaminants. This mixture is separated in settler 5. The separated contaminants are removed through line 7 and then fed to mixer 10 where they are etherized with sulfide reagents and then removed through line 13 and the partially regenerated caustic in line 6 may be cycled to mixer 3 (not shown), where then it is reacted with additional sulfide reagent and taken through line 4 to settler 5 where it is separated in the conventional manner as previously described.

To carry out the process described in FIGURE 2 whereby the caustic is to be regenerated solely by selective extraction with etherized oil contaminants as the extracting solvent, the ratio of solvent to caustic of 0.5 to 2 volumes of etherized oil solvent per volume of caustic soluble oil contaminants present in the spent caustic can be used. The extract phase may then be treated with sulfide reagent to obtain the cyclic sulfide conversion products of the solvent extracted contaminants and to recover additional caustic dissolved in the extract phase.

The regeneration process according to the invention is applicable to alkaline treating agents generally. An example of alkaline treating agents from petroleum processing which can be regenerated according to the invention are alkali metal hydroxides and carbonates and alkaline earth metal hydroxides and carbonates. Specific alkali metal hydroxides which can be regenerated are potassium hydroxide and sodium hydroxide and these are the hydroxides which it is preferred to use in this invention to regenerate.

As previously stated, the concentration of the alkali metal hydroxide present in the spent caustic reagent undergoing treatment, the molecular weight of the cyclic sulfide or imine treating agent, as well as the ratio of treating agent to caustic-soluble organic contaminants present are important. In order to obtain an efficient separation of oily contaminants from the caustic solution being treated and to thus obtain a substantially pure regenerated aqueous caustic solution it is necessary to control these variables. The following examples illustrate the invention.

*Example 1*

A spent caustic from light catalytic cycle oil treating which contained 5.20 wt. percent dissolved organic oxygen and sulfur-containing compounds and 15.5 wt. percent NaOH was contacted with 1.27 mols of propylene sulfide per mol of dissolved organics (38.9 g./liter of caustic) at 80° F. After contacting by vigorous mechanical agitation for 15 minutes, the purified caustic was allowed to settle from a supernatant oil comprising 88.7% of the caustic contaminants. The recovered caustic contained only 0.59% of the dissolved organic materials and 84% of the caustic in the original spent caustic at a concentration of 16.4 wt. percent NaOH. A substantial portion of the caustic dissolved in the etherized oil layer could be recovered by water washing. More detailed data from this and the following examples are summarized in Table I.

*Example 2*

A spent caustic (36.8% NaOH) with 3.89% of dissolved organic oxygen and sulfur-containing compounds extracted from $C_5$–430° F. catalytic naphtha was contacted with 1.00 mol of ethylene imine per mol of dissolved organics (19.0 g./liter of caustic) at 80° F. After vigorous mechanical agitation for 15 minutes, the purified caustic was allowed to settle from a supernatant oil layer comprising 90% of the caustic contaminants. The recovered, purified caustic contained 92.9% of the NaOH but only 0.39% of contaminants.

*Example 3*

A spent caustic which contained 36.8 wt. percent NaOH and 3.89 wt. percent dissolved organic oxygen and sulfur-containing compounds was contacted with one mol of hexamethyleneimine per mol of organic contaminants at 80° F. After vigorous mechanical agitation for 15 minutes, the purified caustic was allowed to settle from a supernatant oil layer comprising 98.7% of the caustic contaminants. The recovered, purified caustic contained 96.7% of the uncombined NaOH in the original spent caustic and with only 0.05 wt. percent of contaminants. The concentration of NaOH in the regenerated caustic was 38.2 wt. percent.

The above data clearly show the effectiveness of the cyclic sulfide and imine reagents used to regenerate spent caustic.

The invention is not intended to be restricted by the above examples, but only by the scope of the appended claims.

What is claimed is:

1. A process for regenerating a spent caustic solution comprising alkaline metal mercaptides and alkali metal aromatic sulfur and oxygen-containing compound contaminents obtained from the treatment of a mineral oil which comprises contacting said spent caustic with a cyclic sulfide or imine compound of the following formula:

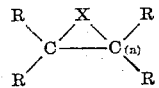

where R is selected from the group consisting of hydrogen and hydrocarbon radicals having 1 to 6 carbon atoms, from the group of alkyl, cyclo alkyl and aromatic, and X is selected from sulfur and nitrogen, and $n$ may be 1 or 2, adding sufficient amounts of said cyclic compounds to react with the alkaline metal mercaptides and a substantial proportion of said alkaline metal aromatic sulfur and oxygen-containing compounds which reaction products form caustic-insoluble etherized conversion products which precipitate and form an oil phase and an aqueous phase, and separating said oil phase from said aqueous phase to recover a caustic phase substantially free of contaminants.

2. The process of claim 1 wherein the concentration of said alkaline metal concentration in the spent caustic solution is 10 to 60 by weight.

3. The process of claim 2 wherein 0.1 to 2.0 moles of cyclic sulfide or imine reagent per moles of organic contaminants present in the spent caustic are added to the spent caustic.

TABLE I.—SEPARATION OF ORGANIC CONTAMINANTS FROM SPENT CAUSTIC WITH PROPYLENE SULFIDE AND ETHYLENE IMINE

[Temperature, 80° F. Pressure, atmospheric]

| Oil Treated with Caustic | Light Cat. Cycle Oil | | $C_5$–430° F. Cat. Naphtha | | | |
|---|---|---|---|---|---|---|
| Cyclic Sulfide or Imine | $C_3H_6S$ | | $C_2H_4NH$ | | Hexamethyleneimine | |
| | Caustic Feed | Test No. 11 | Caustic Feed | Test No. 12 | Caustic Feed | Test No. 14 |
| Reagent/Oil Ratio: | | | | | | |
|   Mols/Mol Oil | 0 | 1.27 | 0 | 1.00 | 0 | 1.00 |
|   Grams/g. Oil | 0 | 0.64 | 0 | 0.31 | 0 | 0.72 |
| Purified Caustic: | | | | | | |
|   Oil Content, Wt. Percent | 5.20 | 0.59 | 3.89 | 0.39 | 3.89 | 0.05 |
|   Percent Oil Removed | | 88.7 | | 90.0 | | 98.7 |
| NaOH Concentration: | | | | | | |
|   Grams/Liter | 181 | 195 | 512 | 534 | 512 | 541 |
|   Wt. Percent | 15.5 | 16.4 | 36.8 | 37.8 | 36.8 | 38.2 |
| NaOH Recovery, Wt. Percent: | | | | | | |
|   In Purified Caustic | | 83.7 | | 92.9 | | 96.7 |
|   In Separated Oil | | 16.3 | | 7.1 | | 3.3 |

References Cited by the Examiner

UNITED STATES PATENTS 2,196,596    4/1940    Muskat    23—184
2,428,623   10/1947    Hewlett et al.    23—184
3,181,932    5/1965    Foreman et al.    23—190

FOREIGN PATENTS 636,600    5/1950    Great Britain.
636,697    5/1950    Great Britain.

MILTON WEISSMAN, *Primary Examiner.*

BENJAMIN HENKIN, OSCAR R. VERTIZ, *Examiners.*

J. J. BROWN, *Assistant Examiner.*